INVENTOR.
JOHN H. CUTLER

BY

Robert R. Strack
ATTORNEY

INVENTOR.
JOHN H. CUTLER

BY

Robert R. Strack
ATTORNEY

Jan. 10, 1967 J. H. CUTLER 3,297,935

ELECTRONIC CIRCUITS

Filed Aug. 9, 1962 5 Sheets-Sheet 3

INVENTOR.
JOHN H. CUTLER

BY

Robert R. Strack
ATTORNEY

INVENTOR.
JOHN H. CUTLER
BY
Robert R. Strack
ATTORNEY

INVENTOR.
JOHN H. CUTLER
BY
ATTORNEY

United States Patent Office 3,297,935
Patented Jan. 10, 1967

3,297,935

ELECTRONIC CIRCUITS

John H. Cutler, Waynesboro, Va., assignor to General Electric Company, a corporation of New York Filed Aug. 9, 1962, Ser. No. 215,909
5 Claims. (Cl. 321—18)

Figures 1, 1A:
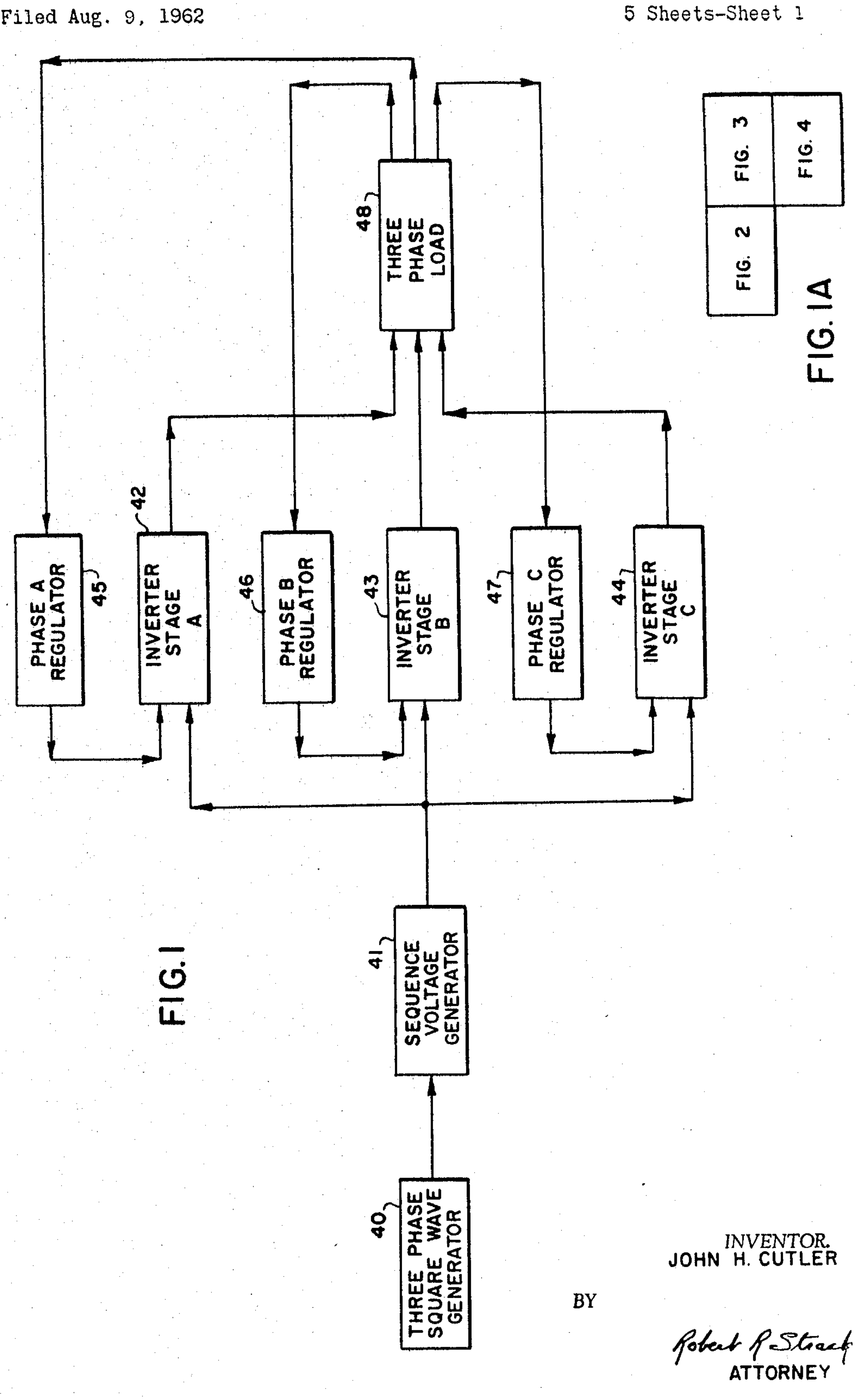

This invention relates to switching circuits; more particularly, it relates to switching circuits using transistors to selectively control the transmission of power between two points.

The use of transistors in the switching mode, i.e., to present either a saturation conduction state or a cut-off state is very common. One particular use is in the output stages of static inverter systems and for purposes of illustration, the present invention is described in such an environment.

In every application of transistors as switches there are at least two areas wherein power losses are effective to impair the efficiency of the switching unit. These areas are: the transistor itself and the control circuitry which establishes the biasing conditions for the transistor. The intermediate operating region between cut-off and full conduction is a high power dissipation region of transistor operation and it is essential for both efficiency and reliability that this region be traversed as quickly as possible. The power lost in the control circuit is limited primarily by the nature of the circuitry and the elements used therein.

In order to switch a transistor into a conducting state, base current must be drawn out of, or driven into, the base, depending upon whether a PNP or NPN type element is involved. For typical power transistors the base current assumes values in the order of amperes. It has become common practice to use self-saturating magnetic amplifiers to drive switching transistors because they furnish a control signal having the favorable characteristics of sharp rise time, accurate time positioning, and considerable amplitude. These characteristics provide rapid switching through the high power dissipation region, a favorable factor; but, existing circuits present a relatively low driving impedance and consequently there is power loss requiring a large magnetic amplifier, an unfavorable factor.

Generally, transistor control circuits include a biasing resistor connected between the emitter and base electrodes. A biasing source connected in parallel with this biasing resistor develops sufficient current therein to furnish enough reverse-bias to maintain the transistor cut-off. When magnetic amplifiers are used as the transistor driving means the emitter-base path is also part of a series circuit including the magnetic amplifier and the energizing source. The presence of the biasing resistor causes power loss during both driving and reverse-biasing of the transistor.

An object of the present invention is to provide a transistor switching circuit having improved efficiency and reliability.

Another object of the present invention is to provide an improved control means for a transistor switching circuit having minimal power dissipation.

It has been found that by using silicon controlled retifiers in the driving circuit of transistors, a low power dissipating circuit becomes available for controlling transistor switching. The controlled rectifier is connected in series with an energizing source which assumes a particular polarization depending upon whether the transistor is to be switched into conduction or maintained in a cut-off state. During driving, the controlled rectified is rendered conductive and a low impedance, low power dissipation path is provided for the necessary base current. During cut-off, a second path is provided for connecting the energizing source across the transistor. Only leakage current flows in this second path and, therefore, very little power is dissipated.

In accordance with an illustrative embodiment of the invention a switching transistor is controlled by an energizing source having a voltage which exhibits a polarity in accordance with whether the transistor is to be switched into conduction or maintained cut off. A suitably controlled means is inserted in series with the energizing source across the control electrodes of the transistor to provide a low impedance circuit path when switching is desired. During cut-off conditions, further means are provided in shunt with the controlled means to provide a reverse-biasing circuit path between said control electrodes.

Figure 2:
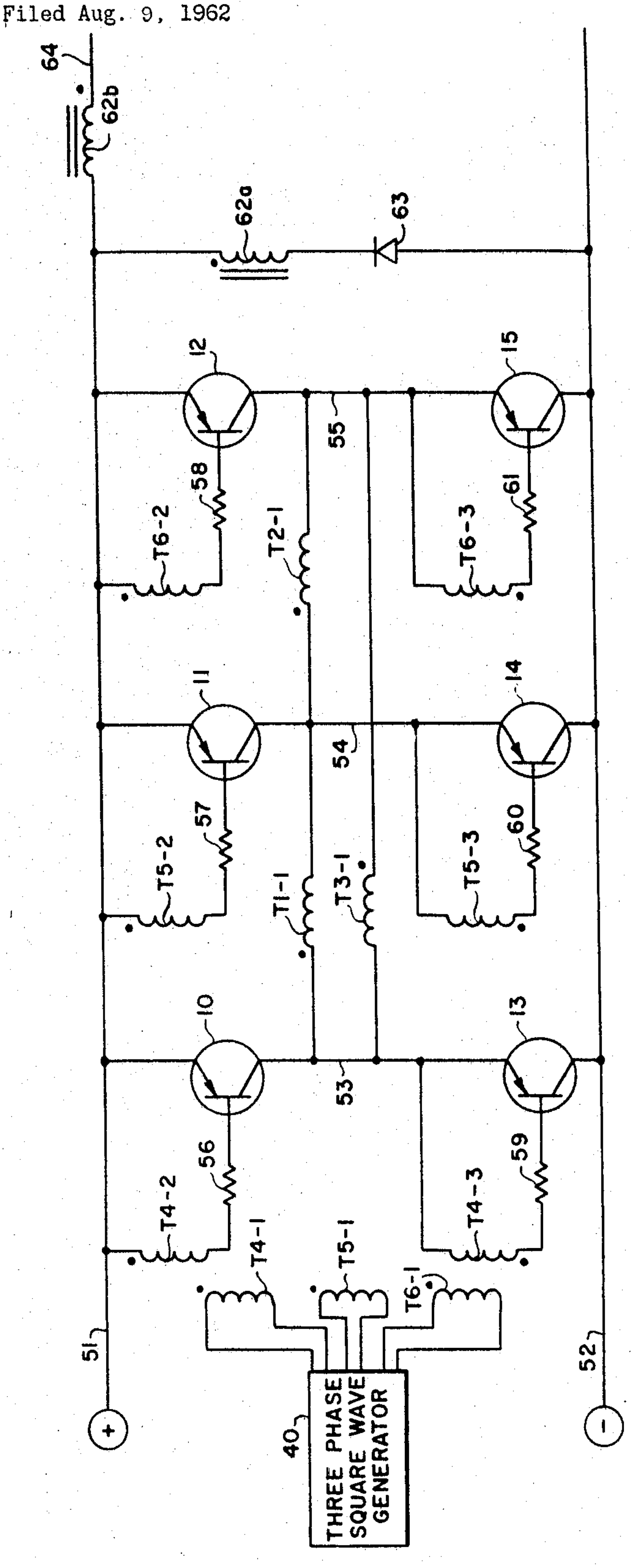
Figure 3:
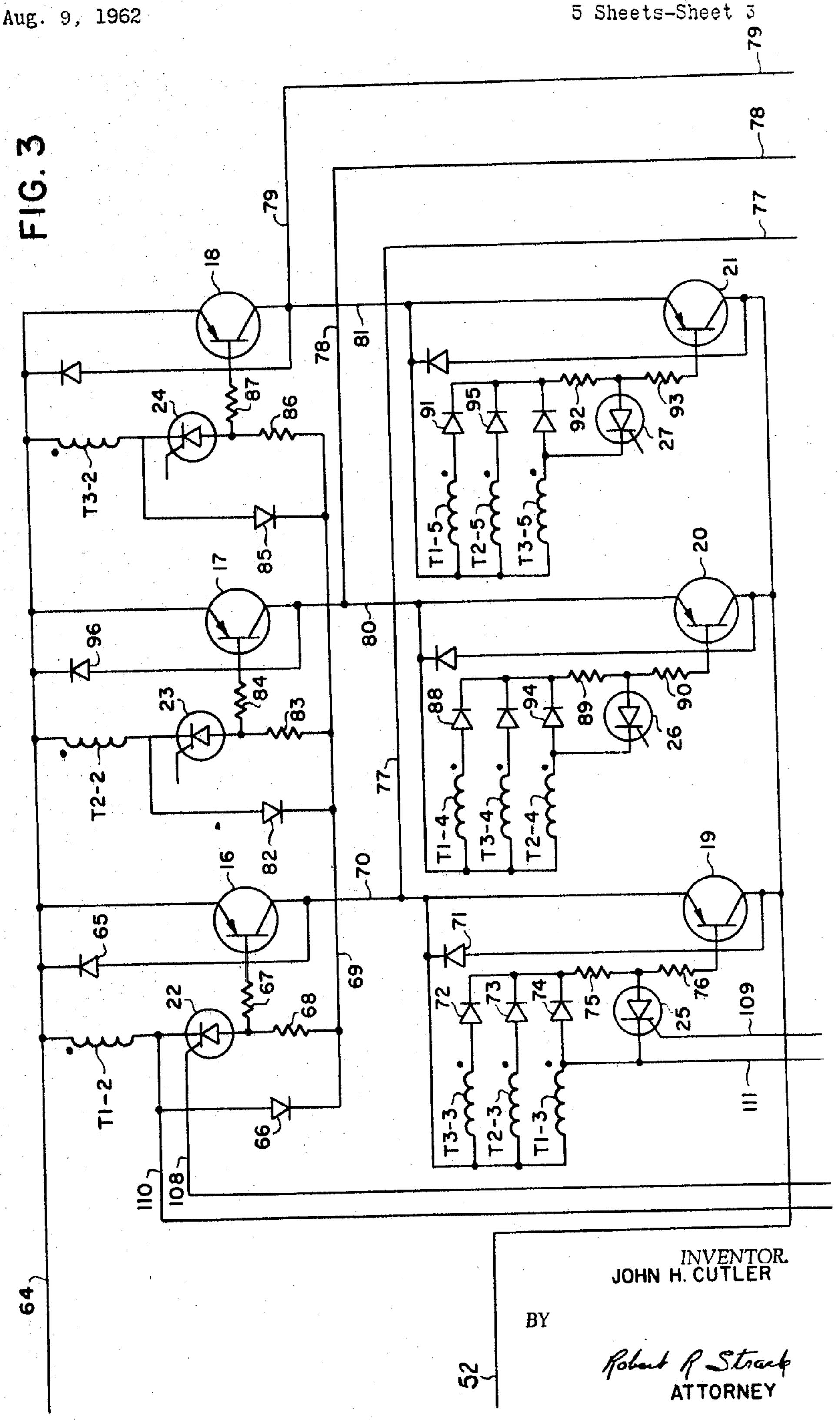
Figure 4:
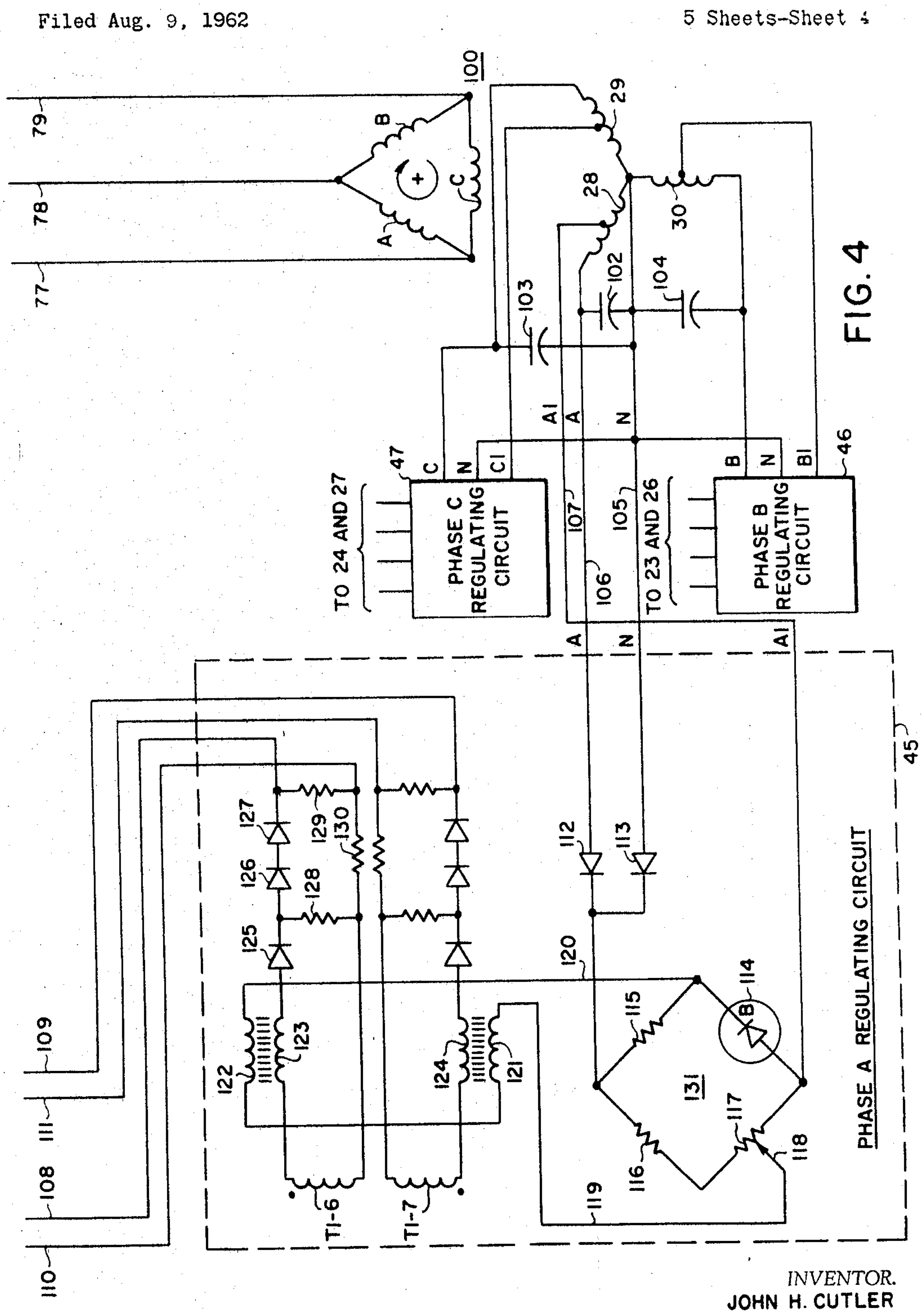
Figures 5, 5A, 5B, 5C, 5D, 5E:
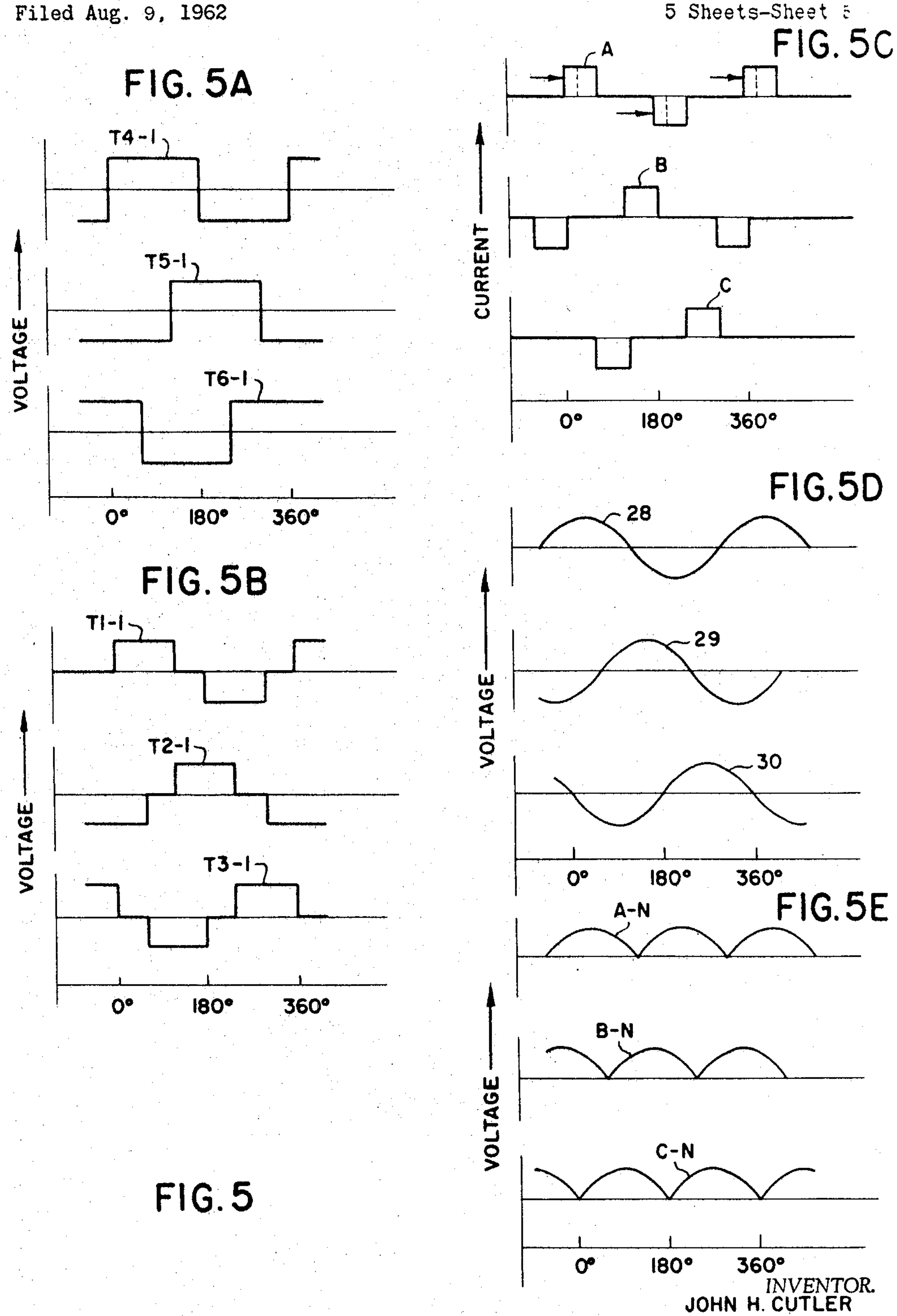

The novel features of the invention are set forth with particularity in the appended claims. The invention itself, however, both as to its organization and method of operation, together with further objects and features thereof may best be understood by reference to the following description taken in conjunction with the accompanying drawings wherein:

FIG. 1 is a block diagram schematic illustrating the basic elements of a static inverter embodying the features of the invention;

FIGS. 2, 3, and 4, when taken together as shown in the layout of FIG. 1A, comprise a circuit schematic of a static inverter embodying an illustrative form of the invention; and FIG. 5 consisting of FIGS. 5A–5E comprise a plurality of waveforms as they appear at particular points in the circuit schematic of FIGS. 2 through 4.

GENERAL DESCRIPTION

The system which forms the environment for the unique circuitry of this invention is depicted in block diagram form in FIG. 1. As shown therein, a plurality of inverter stages 42, 43 and 44 provides a three-phase output for energization of a three-phase load 48. Stages 42, 43, and 44 individually provide single-phase outputs with relative phase relationships determined by sequence voltage generator 41. The function of the sequence voltage generator is to select particular inverter stages in accordance with desired phase order and separation. The control source for the sequence voltage generator to be described hereinafter is a three-phase square wave generator 40; however, the instant invention is directed toward multiphase systems, in general, and is not limited to a three-phase system.

In order to insure a well regulated output, individual voltage regulators 45, 46, and 47 are connected in feedback paths from three-phase load 48 to inverter stages 42, 43, and 44 respectively. As more fully explained hereinafter, regulation is accomplished by generating triggering impulses positioned in time in accordance with the individual voltage level of each phase. In operation, sequence voltage generator 41 selects the particular inverter stage 42, 43, or 44 which is to be connected to the load and the voltage regulator 45, 46, or 47 associated with the selected inverter stage develops a control impulse that determines the duration of power application therethrough. In other words, the power delivered to the load is regulated by pulse width modulation techniques.

The circuit schematic presented by the combination of FIGS. 2, 3, and 4 in accordance with the sheet layout of FIG. 1A is generally developed in accordance with the block diagram of FIG. 1. It should be understood that the use of independent stages for each phase is not essential to the invention and consequently in the circuit schematic three illustrative phases are integrated into a three phase transistor bridge circuit. Before proceeding with a detailed examination of the circuit schematic, it is helpful to recognize the major components in the circuit schematic in terms of the block schematic shown in FIG. 1.

The three-phase square wave generator 40 which serves as an independent frequency control for the inverter, is illustrated on the left of FIG. 2. This source supplies square waves displaced in phase by 120° to the primary windings T4–1, T5–1, and T6–1 of transformers T4, T5, and T6. Secondary windings of these transformers are selectively connected with a three-phase transistor bridge made up of transistors 10, 11, 12, 13, 14 and 15. This transistor bridge serves as sequence voltage generator 41. The individual transistors are triggered into conduction in accordance with the three-phase square wave inputs to the transformer primaries T4–1, T5–1, and T6–1 to develop quasi square wave outputs on the transformer primary windings T1–1, T2–1, and T3–1. The shape of the developed quasi square waves and their relationship to the original square waves is illustrated in FIGS. 5A and 5B. The control of the inverter stages by the sequence voltage generator is fully explained in the detailed circuit description.

The secondary windings of transformers T1, T2, and T3 are uniquely interconnected with the inverter stages shown in FIG. 3. These stages comprise transistors 16, 17, 18, 19, 20, and 21. The conduction of each transistor is jointly controlled by a sequencing voltage applied thereto through a secondary winding of transformer T1, T2, or T3 and a regulating impulse effective via a controlled rectifier individual thereto. Each controlled rectifier is serially connected with a secondary winding between the base and emitter of its associated transistor and thereby controls the conduction of the transistor in accordance with its own conduction state.

As previously mentioned, the present embodiment uses pulse width modulation techniques to regulate the power delivered to a load. In the circuit schematic, a three-phase load is represented in FIG. 4 by the delta connected primary windings A, B, C of a transformer 10. A secondary of this three-phase transformer is used to control the individual phase regulating circuit 45, 46, and 47 which produce the triggering impulses for the controlled rectifiers in the inverter stages. The individual phase regulating circuits are identical and a detailed circuit schematic of only the phase A circuit, 45, is illustrated in FIG. 4.

With the foregoing orientation, a detailed consideration of the circuit schematic will illuminate the specific unique features of the invention.

DETAILED CIRCUIT DESCRIPTION

In the circuit schematic, clarity of illustration is facilitated by showing the various transformer windings in positions relative to their functioning in the actual circuit. The designation of each transformer winding is made up of two portions, the first representing the transformer itself and the second representing the particular winding thereof. For example, the designation T4–1 refers to the primary winding of transformer T4, and the designation T4–3 refers to one of the secondary windings, "3," of transformer T4.

As a further aid in understanding the invention, a graphic illustration of circuit operation is made available by the waveforms presented in FIG. 5. In general, these waveforms are identified with the same designations as the compponents at which they appear. Thus, the waveforms in FIG. 5A represent the signals applied by three-phase square wave generator 40 to the primary windings T4–1, T5–1, and T6–1 of the input transformers T4, T5, and T6 and are designated T4–1, T5–1, and T6–1 respectively. The waveforms in FIG. 5B represent the quasi-square wave sequencing voltages developed in the primary windings T1–1, T2–1, and T3–1 and are designated T1–1, T2–1, and T3–1, respectively.

*Sequence voltage generation*

The sequence voltage generator in which the quasi-square wave voltages are developed comprises a three-phase transistor bridge having output leads 53, 54, and 55. The bridge consists of three transistor pairs 10 and 13, 11 and 14, and 12 and 15 connected between conductors 51 and 52. A direct voltage source establishes a relative potential relationship of plus to minus between conductors 51 and 52 and the transistors, having a PNP nature, are connected to pass current between the conductors if simultaneously switched into conduction. Secondary windings of a particular input transformer, T4, T5, or T6, are serially connected between the emitter and base of the transistors in each pair to furnish control voltages. As indicated by the conventional "dot" notation, the windings are reverse oriented for each transistor and consequently only one transistor in the pair will be rendered conducting at any one time.

Transistor pair 10 and 13 is typical. Transistor 10 has its emitter connected directly to positive conductor 51; its base connected via a resistor 56 and secondary winding T4–2 to positive conductor 51; and its collector connected via output conductor 53 and the emitter-collector path of transistor 13 to negative conductor 52. Transistor 13 has a similar control circuit comprising a resistor 59 and transformer secondary T4–3 connected between its base and emitter electrodes. A difference exists, in that the windings of secondaries T4–2 and T4–3 are oppositely oriented with respect to their associated base-emitter paths.

Output conductors 54 and 55 are connected respectively with transistor pairs 11 and 14, and 12 and 15 in circuits identical to that described in conjunction with transistor pair 10 and 13. The transformers controlling transistor pairs 11 and 14, and 12 and 15, are T5 and T6, respectively.

The output of the sequence voltage generator is applied to the primary windings of transformers T1, T2, and T3. These primary windings, T1–1, T2–1, and T3–1, are connected with appropriate orientation between conductors 53 and 54, 54 and 55, and 55 and 53, respectively. The actual generation of the sequence voltages may be appreciated by a consideration of circuit functioning during the intial portions of an operating cycle.

As shown in FIG. 5A, upon initiation of a typical cycle, i.e., at 0°, the square wave applied to primary T4–1 assumes a positive potential. At this time, the square wave applied to primary T5–1 is at a negative potential and the square wave applied to primary T6–1 is at a positive potential. In response to the applied voltage, the induced voltage in the secondaries of transformers T4, T5, and T6, render transistors 10, 12, and 14 conductive while maintaining transistors 11, 13, and 15 nonconductive.

The positive voltage appearing at the dotted terminals of secondary T4–2 in response to the positive voltage applied to the dotted terminal of primary T4–1 is effective to forward-bias PNP transistor 10 in the circuit comprising the dotted terminal of transformer secondary T4–2, the emitter-base path of transistor 10, resistor 56, and the undotted terminal of transistor secondary T4–2. This renders transistor 10 conductive. Coincidentally, PNP transistor 13 is reverse-biased and maintained nonconductive due to the positive voltage appearing at the dotted terminal of transformer secondary T4–3. Similar voltage conditions control transistor pairs 11 and 14, and 12 and 15.

The conduction pattern of transistors 10, 11, 12, 13, 14, and 15 establishes circuit paths through the primary windings of transformers T1, T2, and T3 that generate the intial condition of the sequence voltage output cycle. The sequence voltage waveforms are shown in FIG. 5B and may be considered quasi-square waves having active duty periods of 120° duration separated by inactive periods of 60° duration. Alternate duty cycles are of opposite polarity. During a complete cycle of operation, each quasi-square wave takes the form of a positive voltage for 120°, a zero voltage for 60°, a negative voltage for 120°, and a zero voltage for 60°.

At 0°, as shown in FIG. 5B, a positive voltage is applied to the dotted terminal of primary T1–1, a negative voltage is applied to the dotted terminal of primary T2–1, and no voltage is applied to primary T3–1. The application of power to these transformer primary windings is of course determined by the transistor conduction pattern. Keeping in mind the conduction pattern established at 0°, it will be seen that current flows between positive conductor 51 and negative conductor 52 through transformer primaries T1–1 and T2–1 at this time. In the case of transformer primary T1–1, the circuit path includes transistor 10 and transistor 14 and in the case of transformer primary T2–1, the circuit path includes transistor 12 and transistor 14. The resultant interconnection of the supply conductors causes current flow in opposite directions through the primary windings and this accounts for the negative polarity of the power applied to transformer primary T2–1.

Each time one of the applied square waves from three-phase square wave generator 40 changes its condition, a new conduction pattern is established in the sequence voltage generator bridge and a different pattern of power is applied to transformer primaries T1–1, T2–1, and T3–1. The cumulative effect of the square wave inputs during a complete cycle is illustrated graphically by the three waveforms shown in FIG. 5B.

*Power inversion*

The three-phase load supplied by the instant circuit is illustrated in FIG. 4 as a three-phase transformer 100 having a delta connected primary and Y connected secondary. The delta connected primary has its individual phase windings designated A, B, and C. In the subsequent discussion, the power applied to these phase windings will be referred to as phase A, phase B, and phase C, respectively. The Y connected secondary comprises individual center-tapped windings designated 28, 29, and 30. Center-tap designations of A1, B1, and C1 indicate the particular phase with which each winding is associated and N designates the neutral point of the Y configuration.

The present embodiment converts direct current power to three-phase alternating current power and delivers this to load 100 in amounts controlled by means of pulse width modulation. The direct current power is represented by a relative polarity of (+) and (−) associated with supply conductors 51 and 52. This direct current power is selectively applied to load transformer 100 in a circuit comprising a series inductance 62B, a conductor 64, a transistor 16, 17, or 18, load transformer 100, and a transistor 19, 20, or 21. A second inductance 62A, which is magnetically coupled to 62B, is connected in series with a reverse-oriented conventional rectifier 63 directly between conductors 51 and 52. The function of inductance 62B is essentially to create the effect of a current source for the output inverter stages. When all of the output transistors 16 through 21 are rendered nonconducting, the collapsing field in inductance 62B develops a high voltage transient that tends to damage the output transistors. Coupled inductance 62A and rectifier 63 eliminate such damage by providing a path for returning the developed current to the direct current source.

Each inverter stage consists of power transistors and the control circuitry for enabling them at an appropriate time in accordance with the power phase they supply and for switching them into conduction for intervals in accordance with the amount of power desired. As used herein, the expression "enable" refers to the conditioning of a transistor to insure conduction. It does not infer actually establishing a conducting state therein. The expressions "switching" or "triggering" refer to changing the state of the transistor from non-conducting to conducting. In order to trigger a transistor, it is necessary that it first be enabled.

The inverter stages are arranged in a three-phase bridge circuit comprising transistor pairs 16 and 19, 17 and 20, and 18 and 21, connected between positive conductor 64 and negative conductor 52. The junction between each transistor pair is connected to one of the terminals of the delta connected primary of transformer 100. This configuration makes the conduction of each transistor of a pair determinative of the polarity of power applied to the particular phase associated with that pair of transistors. Each transistor is selectively enabled by sequencing voltages induced in associated secondary windings of the sequence voltage generator output transformers T1, T2, and T3. Each transistor is selectively triggered into conduction by a circuit closure created in associated silicon controlled rectifiers controlled by a voltage regulating circuit.

The upper inverter portion of each inverter stage is identical and, therefore, the portion controlling phase A will be described as typical. In this portion, PNP transistor 16 has its emitter connected to positive conductor 64 and its collector connected via conductor 70 and the emitter-collector path of transistor 19 to conductor 52; transistor 19 being part of the lower portion of the inverter stage in which transistor 16 appears. Conduction of transistor 16 is controlled by silicon controlled rectifier 22 and transformer secondary T1–2 which are serially connected with resistor 67 between the collector and positive conductor 64. Secondary T1–2 is oriented to forward bias or enable transistor 16 when a positive voltage is applied to the dotted terminal of primary T1–2; however, controlled rectifier 22 must be in a low impedance state to permit switching.

The anode of controlled rectifier 22 is connected by a resistor 68 to a common conductor 69 which is common to the upper portion of each inverter stage. The cathode of controlled rectifier 22 is connected by a conventional rectifier 66 to this same conductor 69 in a fashion to permit current flow from the cathode to the conductor. By means of resistor 68, rectifier 66, and their counterparts in the upper portions of the other inverter stages, each transistor is maintained in a reverse-biased condition at all times except during the selective application of a forward bias potential thereto.

One further element to be noted in conection with the upper portions of the inverter stages in FIG. 3, is the use of a conventional rectifier, such as rectifier 65 associated with transistor 16, for reducing the inverse voltages which may appear between the collector and emitter electrodes during nonconducting intervals. Rectifier 65 is connected between the collector and emitter electrodes with an orientation in opposition to the emitter-to-collector junction.

The lower portions of the inverter stages are identical and thus the stage controlling phase A will again be described as typical. The lower portions differ from the upper portions in that a common positive conductor does not interconnect the emitters. In order to compensate for this, it is necessary to have duplicate transformer secondary windings associated with each transistor. The basic control concepts are the same, however, and the control circuit for each stage comprises a controlling secondary winding serially connected with a controlled rectifier and resistor between the emitter and collector of the transistor. For example, in the case of transistor 19, transformer secondary T1–3 is serially connected with silicon controlled rectifier 25 and resistor 76 between the emitter and collector electrodes. A conventional rectifier 74 in series with a resistor 75 shunts the controlled rectifier 25 and functions in a manner similar to their counterparts, rectifier 66 and resistor 68 of the upper portion of the inverter stage.

As more fully described hereinafter in conjunction with a typical operating cycle, reverse-biasing during non-conduction of transistor 19 is accomplished by individual series circuit consisting of secondary T2–3 with rectifier 73, and secondary T3–3 with rectifier 72, both connected in parallel with the series circuit of secondary T1–3 and rectifier 74.

The application of power during a typical portion of a normal operating cycle will now be considered. This can most advantageously be done in conjunction with FIG. 5 wherein the current pulses applied to the primary of load transformer 100 are shown in FIG. 5C and the voltages induced in the secondary thereof are shown in FIG. 5D.

At an instant of time correspoding to 0°, sequence voltage transformer primary T1–1 experiences a positive voltage, transformer primary T2–1 experiences a negative voltage, and transformer primary T3–1 experiences no volatge at all. This is shown in FIG. 5B. The effect of these primary voltages is reflected in the inverter stages by the enablement of transistors 16 and 20 and the application of a reverse-bias to all other transistors. Although thus enabled, transistors 16 and 20 are not switched into conduction until their associated controlled rectifiers are triggered to a low impedance state. Triggering of the controlled rectifiers is under the control of the voltage regulating circuitry and will be discussed later. For present purposes, it is assumed that the output voltage is much below rating and the voltage regulating circuitry is triggering the controlled rectifiers to their low impedance condition during the entire period of enablement.

Transistor 16 is rendered conductive by the forward biasing potential generated in transformer secondary T1–2. The forward-bias path comprises the dotted terminal of tansformer secondary T1–2, the emitter-collector path of transistor 16, resistor 67, controlled rectifier 22, and the undotted terminal of secondary winding T1–2. Simultaneously, transistor 20 is rendered conductive in a forward-biasing path including the undotted terminal of transformer secondary T2–4, the emitter-collector path of transistor 20, resistor 90, controlled rectifier 26, and the dotted terminal of secondary winding T2–4.

Conduction of transistors 16 and 20 provides a current path from positive conductor 64 to negative conductor 52 which includes phase winding A of the delta connected primary of transformer 100. A path also exists through phase windings B and C, but the flow therein is minimal for present purposes. The circuit through phase A includes conductor 64, the emitter-collector path of transistor 16, conductors 70 and 77, phase winding A, conductors 78 and 80, the emitter-collector path of transistor 20, and conductor 52. FIG. 5C illustrates this current conduction as a first positive pulse of waveform A. For purposes of illustration, it is assumed that current flow in a clockwise direction in the primary windings (as shown by the symbol drawn within the primary windings) is a positive current flow and that current flow in a counterclockwise direction is a negative current flow.

The first pulse of current in waveform A has a dotted portion and a solid portion. This is merely an illustrative technique to indicate that the instant of application of the current pulse is variable under the control of the voltage regulating circuits. Assuming instantaneous conduction of the controlled rectifiers, the pulse would be initiated at 0°; however, a delay in the conduction of the controlled rectifiers would be effective to cause a later initiation, as shown by the dotted line.

At 60°, the quasi-square wave sequencing voltages change their conditions and particular inverter stages are selectively switched. The voltage applied to transformer primary T1–1 is still positive, that applied to transformer primary T2–1 is zero, and that applied to transformer primary T3–1 is negative. In response to this primary conditioning, the secondaries of the transformers T1, T2, and T3 enable transistors 16 and 21 for conduction. Assuming low impedance states in controlled rectifiers 22 and 27, these transistors conduct and create a path through the load which includes positive conductor 64, the emitter-collector path of transistor 16, conductors 70 and 77, phase winding C of the delta connected primary of transformer 100, conductors 79 and 81, the emitter-collector path of transistor 21 and negative conductor 52. This current flow in phase winding C is in a counterclockwise direction and hence is shown in waveform C as being of negative polarity.

At 120°, the sequencing voltages are again changed and transformer primary T1–1 experiences no voltage, transformer primary T2–1 experiences a positive voltage, and transformer primary T3–1 experiences a negative voltage. Under these conditions, transistors 17 and 21 are rendered conductive causing a positive current flow through the phase B winding of transformer 100.

At 180°, the sequencing voltages again change and present the conditions of: a negative voltage on primary winding T1–1, a positive voltage on primary winding T2–1, and zero voltage on primary winding T3–1. This conditioning results in conduction of transistors 17 and 19 and creates a current from positive conductor 64 to negative conductor 52 which flows through phase A of the transformer primary 100 in a counterclockwise direction creating a negative current flow. The negative pulse produced is shown in waveform A of FIG. 5C.

The pattern of operation is now apparent. As the sequencing voltages modify their interrelationship, current pulses are applied to particular primary windings of the primary of transformer 100; the particular windings being determined by the sequencing voltages.

Throughout an entire cycle, as shown in FIG. 5C, alternate polarity pulses are applied to each phase winding with a separation of 180°. Each phase of the Y connected secondary of output transformer 100 is tuned by a shunting capacitor to resonate at the frequency of the input frequency source. Specifically, winding 28 is tuned by a capacitor 102, winding 29 is tuned by a capacitor 103, and winding 30 is tuned by a capacitor 104. The voltage induced in the secondary windings will tend to ring at the selected frequency and by applying the appropriately synchronized alternate polarity pulses to the primary winding, this ringing is sustained and encouraged. The amount by which the output is enhanced is determined by the amplitude and duration of the current pulses applied to the delta connected primary. FIG. 5D contains three waveforms of the voltage appearing in secondary windings 28, 29, and 30 of the Y connected secondary of transformer 100. The pulses generated in phase windings A, B, and C respectively appear at or near the peaks of the sinusoids of their associated secondary winding 101.

*Biasing of switching transistors*

It is now well recognized that the forward-biasing of each switching transistor occurs when a proper polarity voltage is induced in its associated phase sequencing transformer secondary winding coincidently with the low impedance condition of its associated controlled rectifier. Prior to this time, it is essential that the transistors experience a reverse-biasing of sufficient magnitude to maintain them in a cut-off condition. Power dissipation occurs during the cut-off period as well as during the conducting period and reduces the efficiency of the control circuitry. Thus, a unique circuit arrangement has been devised to minimize this particular power loss.

In prior art transistor control circuits, biasing is generally implemented by means of a biasing source in parallel with a biasing resistor that is connected in series with the emitter-base path of the transistor. When magnetic amplifiers are used as the transistor driving means, the emitter-base path is also part of a series circuit comprising the energizing source, rectifying means, the magnetic amplifier gate windings, and the biasing resistor. Because the biasing resistor must be designed to develop sufficient reverse-bias for cut-off, during delivery of driving power a substantial voltage drop is necessarily developed thereacross. For example, between 25% and 33% of the driving power is consumed by this biasing resistor. Furthermore, during reverse-biasing, the biasing source delivers power directly across the biasing resistor and the power consumed therein is all lost.

By means of the biasing circuitry of this invention, the aforementioned biasing resistor is eliminated and consequently, considerable economy of power is effected. Considering the upper portion of the inverter stage controlling phase A, the biasing circuit for transistor 16 comprises biasing source T1–2, rectifier 66, resistor 68, and small coupling resistor 67. When the voltage induced at the dotted terminal of secondary winding T1–2 is negative, transistor 16 is reverse-biased in a series circuit which includes its own emitter-base path. Due to this circuit arrangement, during reverse-biasing only the leakage current of nonconducting transistor 16 and nonconducting controlled rectifier 22 flows. In other words, during reverse-biasing a current in the order of several milliamperes is required whereas the above described prior art circuit commonly required several amperes.

During the driving interval, the elimination of the series biasing resistor is also effective to reduce power loss. The driving circuit for transistor 16 comprises energy source T1–2, controlled rectifier 22 and small coupling resistor 67. The extremely low impedance of this driving circuit creates only a slight power loss as compared with that of the described prior art circuit.

The joint control over each transistor by both the phase sequencing means and the voltage regulating means creates the problem during each operating cycle of a forward-biasing polarization of the bias source while the associated transistor is maintained nonconducting due to the high impedance state of its controlled rectifier. For example, when phase A is selected, transformer secondary T1–2 has a positive voltage induced at the dotted terminal thereof. Until controlled rectifier 22 is triggered to its low impedance state, transistor 16 is nonconductive and in the meantime the regular reverse-biasing path comprising secondary T1–2, rectifier 66, and resistors 68 and 67 is ineffective. However, by virtue of the conductor 69, the reverse-biasing circuitry of transistors 16, 17, and 18 is made available, in common, to all transistors. Thus, during this particular interval (e.g., 0°–60° of the operating cycle) transistor 16 is reverse-biased in the circuit comprising secondary T2–2, rectifier 82, conductor 69, resistors 68 and 67, its base-emitter path, and conductor 64. In a similar manner, each transistor in the upper portion of the inverter stages is held cut-off in a high impedance circuit until rendered conductive by the control circuit.

The lower portion of each inverter stage is biased in the same manner; however, a common interstage conductor is not available. To compensate for this lacking conductor, the secondaries of each phase sequencing transformer are connected in the control circuit of each transistor. This provides a properly polarized reverse-biasing source for each transistor throughout a complete cycle of operation.

Before proceeding to a consideration of the voltage regulating circuitry, the presence and operation of the protecting rectifiers connected across each transistor should be noted and understood. As previously mentioned, conventional rectifiers are connected across the collector-emitter electrodes of each of the switching transistors with an orientation in opposition to the low conductivity direction of the transistors. Inductive loads store energy and upon termination of conduction in the transistors, this energy must be returned to the supply. The collapsing field in the inductive load generates a back voltage which appears as an inverse voltage across the switching transistors. In order to by-pass this back voltage and thereby minimize undesirable heating of the transistors, conventional rectifiers are used. For example, during the period following initiation of a cycle (after 0°), current flows through transistor 16, phase winding A, and transistor 20. At 60°, transistor 20 is rendered nonconductive and the collapsing field in phase winding A and its associated circuitry generates a positive voltage in the phase winding. Since transistor 20 is now cut off, the energy is furnished a low impedance path back to the source consisting of conductor 52, rectifier 71, conductors 77, 78, and 80, and rectifier 96. A similar path is provided during each cut-off interval and consequently, the peak inverse voltages upon the switching transistors are kept to a minimum.

*Voltage regulation*

Individual regulating circuits are associated with each phase in the present inverter in order to provide accurate and well-controlled output voltages. Because each of the regulating circuits are identical, only the one associated with phase A is illustrated in detail within dashed box 45 in FIG. 4. The comparable phase regulating circuits for phases B and C are shown by boxes 46 and 47 having input and output leads for performing functions for their individual phases, comparable to those of the phase A regulating circuit.

The function of each voltage regulating circuit is to control the duration of the power pulses applied to a particular phase winding of the output transformer 100 in accordance with the magnitude of the output voltage from the associated secondary winding thereof. As shown by the phase A regulating circuitry, the output voltage is sensed at secondary winding 28, compared with a reference in a reference bridge 131 and used to develop an error voltage for control of a magnetic amplifier. The magnetic amplifier, comprising control windings 121 and 122 and gate windings 124 and 123, generate triggering pulses for controlled rectifiers 22 and 25 in accordance with the amount of power required to develop the desired output voltage.

Three outputs are extracted from the Y connected secondary winding of transformer 100. These outputs appear on conductors 107, 106, and 105 and are associated with terminals A1, A, and N. Terminal A1 is the center-tap of the phase A secondary winding 28, terminal A is one end of this winding, and terminal N is the neutral point. The described conductors apply the voltage induced in winding 28 to voltage measuring bridge 131 wherein an error signal is generated for application to the control windings 121 and 122 of the magnetic amplifier.

Voltage reference bridge 131 is formed by the closed series connection of the anode of a reference diode 114, a potentiometer 117, a resistor 116, a resistor 115, and the cathode of reference diode 114. The voltage to be compared is applied with a positive polarity between the junction of resistors 115 and 116 and the junction of potentiometer 117 and reference diode 114, respectively. The error signal representing the required correction to achieve a desired output condition, is then available between the sliding contact 118 of potentiometer 117 and the junction of reference diode 114 and resistor 115.

The output of phase A, is full-wave rectified by conventional rectifiers 112 and 113 and applied to the junction of resistors 115 and 116. Rectifier 112 is connected by a conductor 106 to terminal A of the secondary of transformer 100 and rectifier 113 is connected by conductor 105 to terminal N thereof. Both rectifiers are oriented to apply positive voltages to the aforementioned resistor junction. The center-tap terminal A1 of the phase A secondary winding 28 is connected to the junction of potentiometer 117 and reference diode 114. Because the functioning of bridges similar to 131 is well known, details of the generation of an error signal will be omitted. However, it may be noted that the position of slider 118 is effective to set the output voltage level for phase A.

The magnetic amplifier controlled by the error signal developed in reference bridge 131 is divided into two portions for individually controlling the upper and lower portions of the inverter stage associated with phase A. The magnetic amplifier portions are identical and are energized by the secondary windings T1–6 and T1–7, respectively, of sequence voltage output transformer T1. Due to this energization, the magnetic amplifier associated with the particular phase receiving power is operative only during the time that phase is being controlled. During the other portions of the operating cycle, the magnetic amplifiers associated with the other phases are operating.

Both halves of the magnetic amplifier circuitry are identical and, therefore, the portion used to control the upper portion of the inverter stage in phase A will be described. The magnetic amplifiers are of the self-saturating variety wherein the input power is effective to increase the saturation of the magnetic core until full saturation occurs. Upon full saturation, the high inductive impedance originally presented to the input power becomes negligible and a well-defined pulse output becomes available. The magnetic amplifier illustrated has a conventional gate winding 123 serially connected with the energization winding T1–6. A rectifier 125, oriented to pass a positive pulse, is connected in series with gate winding 123 and a resistor 128 across secondary winding T1–6 in order to provide a magnetizing current path. Upon saturation of the core of the magnetic amplifier, an output pulse appears across the resistor 128.

The output pulse developed across resistor 128 upon saturation of the magnetic amplifier is transmitted via a pair of series connected rectifiers 126 and 127 and a conductor 108 to the gate electrode of silicon controlled rectifier 22. The opposite side of transformer secondary T1–6 is connected via a resistor 130 and a conductor 110 to the cathode of controlled rectifier 22. Consequently, the positive voltage pulse developed by the magnetic amplifier triggers controlled rectifier 22 into a lower impedance state. A resistance 129 shunts the gate and cathode electrodes of controlled rectifier 22 in order to provide a high impedance path for the current pulse.

Those familiar with the operation of magnetic amplifiers know that the instant of saturation thereof is variably controlled by current flow in the control windings 122. This current is determined by the error voltage from the reference voltage bridge and consequently, the instant at which the magnetic amplifier provides a triggering pulse for controlled rectifier 22 is commensurate with the power required to deliver the desired voltage to the output winding of phase A.

*Elimination of erroneous triggering*

A silicon controlled rectifier is a relatively sensitive gating device operative upon the application of small amounts of power between its gate and cathode electrodes. It is this characteristic that renders it so well suited to use as an intermediate element between the magnetic amplifiers and the switching transistors. In order to avoid inadvertent firing during the initial saturating phase of magnetic amplifier operation, means are provided for providing a threshold that the triggering pulse must exceed before it will be applied to the controlled rectifier. This means comprise conventional rectifiers 126 and 127 serially connected in the triggering path. Such conventional rectifiers have a typical forward voltage drop of approximately 0.75 volt. Thus, until the voltage across resistor 128 reaches at least 1.5 volts, no power will be transmitted through rectifiers 126 and 127. The initial magnetizing current does not develop this high a voltage across resistor 128 and, therefore, the output during magnetization of the magnetic amplifier is blocked from the controlled rectifiers.

The lower portion of the inverter stage controlling phase A includes controlled rectifier 25 which is triggered by magnetic amplifier circuitry illustrated as supplied by transformer secondary T1–7. As in the case of the previously described control circuit, at an instant determined by the error voltage, a triggering impulse is developed between conductors 109 and 111 that is effective to switch controlled rectifier 25 to a low impedance state. This state is effective to switch transistor 19 into conduction, providing it has been enabled by the sequencing voltage generator, at the appropriate time in the operating cycle to develop the desired output voltage.

In recapitulation, an inverter has been described wherein a transistor bridge is controlled by controlled rectifiers to provide well regulated three-phase power to a load. The amount of power applied to the load at any time is determined by individual regulating circuits associated with each phase. These regulating circuits include magnetic amplifiers which establish the conduction interval of the controlled rectifiers. Accurate phase sequencing is accomplished by generating a quasi-square wave sequence voltage for selectively enabling appropriate transistors in said bridge to interconnect the direct current power supply to the load for the period determined by the conduction intervals of the controlled rectifiers.

While the above described circuit constitutes a particular embodiment of the invention it will, of course, be understood that it is not wished to be limited thereto since modifications can be made both in the circuit arrangement and in the instrumentalities employed and it is contemplated in the appended claims to cover any such modifications as fall within the true spirit and scope of the invention.

What is claimed as new and desired to be secured by Letters Patent of the United States is:

1. In a control circuit for a transistor having two output electrodes and a control electrode, a source of power, a load connected in series with said output electrodes and said source of power, regulating means connected to said load and operative to produce a signal at a time determined by the deviation of the voltage across said load from a predetermined value, a source of biasing voltage adapted to provide a voltage having a first or second polarity in accordance with whether said transistor is to assume a conducting or nonconducting state between said output electrodes, controlled unidirectional current conducting means serially connecting said source of biasing voltage between said control electrode and one of said output electrodes and being responsive to said signal to assume a low impedance state, and unidirectional current conducting means in parallel with said controlled unidirectional current conducting means providing a low impedance path for current of the opposite sense from that provided by said controlled unidirectional current conducting means.

2. In a control circuit for a transistor having an emitter, collector, and base electrode, a source of power, a load connected in series with said emitter and collector electrodes and said source of power, regulating means connected to said load and operative to produce a signal at a time determined by the deviation of the voltage across said load from a predetermined value, a source of biasing voltage adapted to alternately provide a voltage having a first or second polarity in accordance with whether said transistor is to assume a conducting or nonconducting state, respectively, controlled unidirectional current conducting means serially connecting said source of biasing voltage between said emitter and base electrodes and being selectively responsive to said signal to selectively assume a low impedance state for current produced responsive to voltage of said first polarity, and unidirectional current conducting means in parallel with said controlled unidirectional current conducting means providing a low impedance path for current produced responsive to voltage of said second polarity.

3. In a control circuit for a plurality of switching means connected between a source of power and a load, said switching means being operative to assume a high or low impedance state in response to the application of voltages of opposite polarities to the terminals thereof, a source adapted to provide a plurality of control signals separated in phase by a predetermined amount, each of said control signals comprising voltages alternating in polarity at a fixed rate, a first and a second unidirectional current conducting means, each serially connecting one of said control signals to the terminals of one of said switching means, said first and second unidirectional current conducting means being oppositely polarized, and means interconnecting the second unidirectional current conducting means associated with each of said switching means to supply one polarity of each of said control signals to each of said switching means.

4. In a control circuit for a plurality of switching means connected between a source of power and a load, said switching means being operative to assume a high or low impedance state in response to the application of voltages of a first or second polarity, respectively, a source adapted to provide a plurality of control signals separated in phase by a predetermined amount, each of said control signals comprising voltages alternating in polarity at a fixed rate, controlled unidirectional current conducting means each serially applying one of said control signals to one of said switching means and being adapted to selectively assume a low impedance state for current produced responsive to voltage of said first polarity, continuously conductive unidirectional current conducting means in parallel with each of said controlled unidirectional current conducting means providing a low impedance path for current produced responsive to voltage of said second polarity, and means interconnecting the continuously conductive unidirectional current conducting means associated with each of said switch means to supply the voltages of said second polarity from each of said control signals to each of said switching means.

5. In a control circuit for a plurality of transistors each of which has two output electrodes and a control electrode, a source of power, a load, means connecting the output electrodes of each of said transistors in series with said source of power and said load, a source of biasing voltage adapted to provide a plurality of control signals separated in phase by a predetermined amount, each of said control signals comprising voltages of a first and second polarity alternating at a fixed rate to control switching of said transistors to a conducting or nonconducting state, respectively, controlled unidirectional current conducting means each serially applying one of said control signals between the control electrode and one of the output electrodes of one of said transistors and being adapted to selectively assume a low impedance state for current produced responsive to voltage of said first polarity, continuously conductive unidirectional current conducting means in parallel with each of said controlled unidirectional current conducting means providing a low impedance path for current produced responsive to voltage of said second polarity, and means interconnecting the continuously conductive unidirectional current conducting means associated with each of said transistors to supply the voltages of said second polarity from each of said control signals to the control electrodes of each of said transistors.

References Cited by the Examiner

UNITED STATES PATENTS

| | | | |
|---|---|---|---|
| 2,912,634 | 11/1959 | Peoples | 321—5 |
| 2,916,687 | 12/1959 | Cronin | 321—5 |
| 2,920,240 | 1/1960 | Macklem. | |
| 2,953,735 | 9/1960 | Schmidt | 321—45 |
| 2,959,725 | 11/1960 | Younkin | 321—18 |
| 3,040,239 | 6/1962 | Walker | 323—43.5 |
| 3,052,833 | 9/1962 | Coolidge | 321—5 |
| 3,088,067 | 4/1963 | Sender. | |
| 3,109,976 | 11/1963 | Sichling. | |

JOHN F. COUCH, *Primary Examiner.*

LLOYD McCOLLUM, *Examiner.*

J. M. THOMSON, M. L. WACHTELL, *Assistant Examiners.*